June 29, 1954 — W. BENNETT — 2,682,319
BRAKE
Filed Dec. 8, 1947 — 3 Sheets-Sheet 3
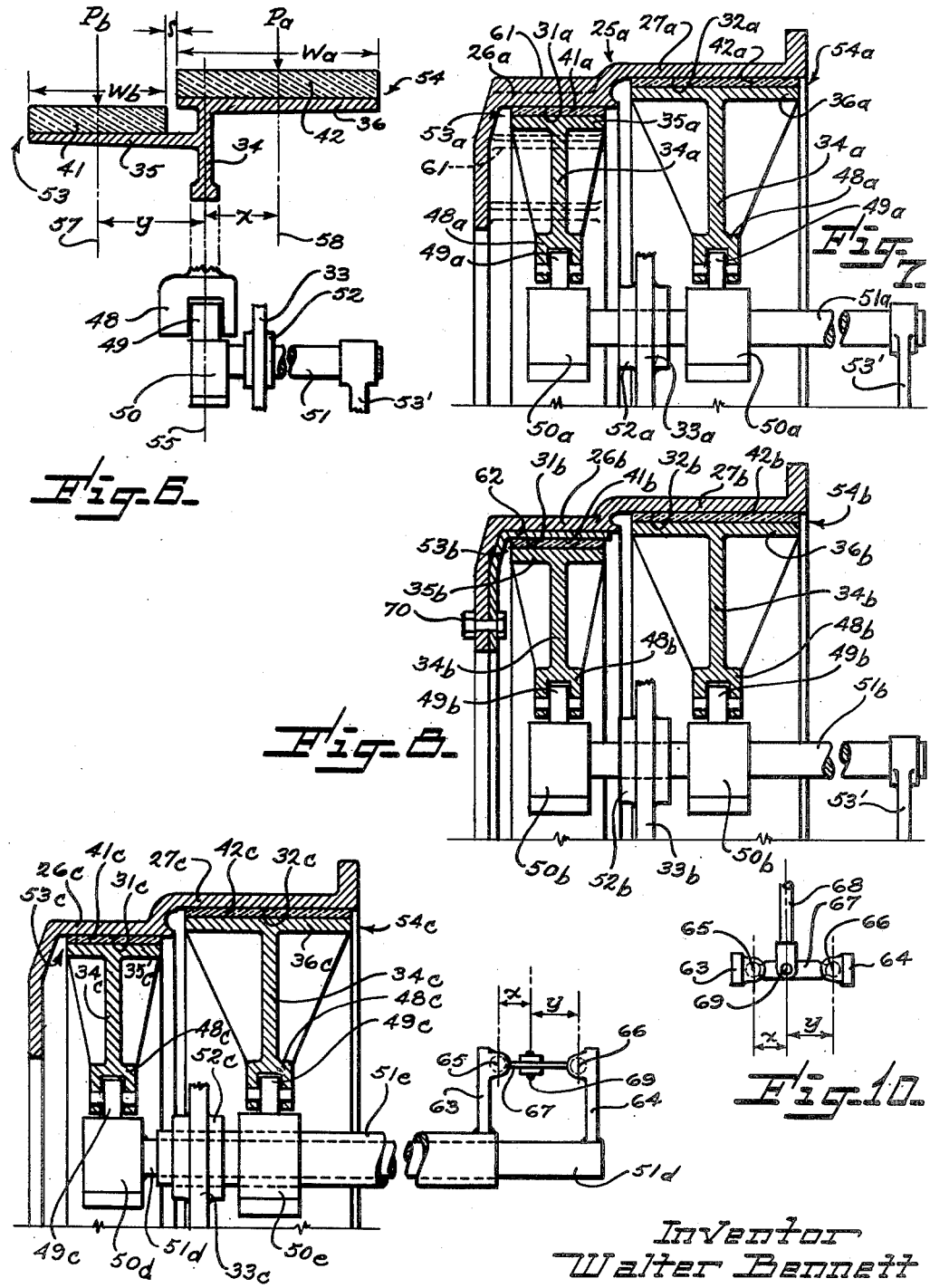

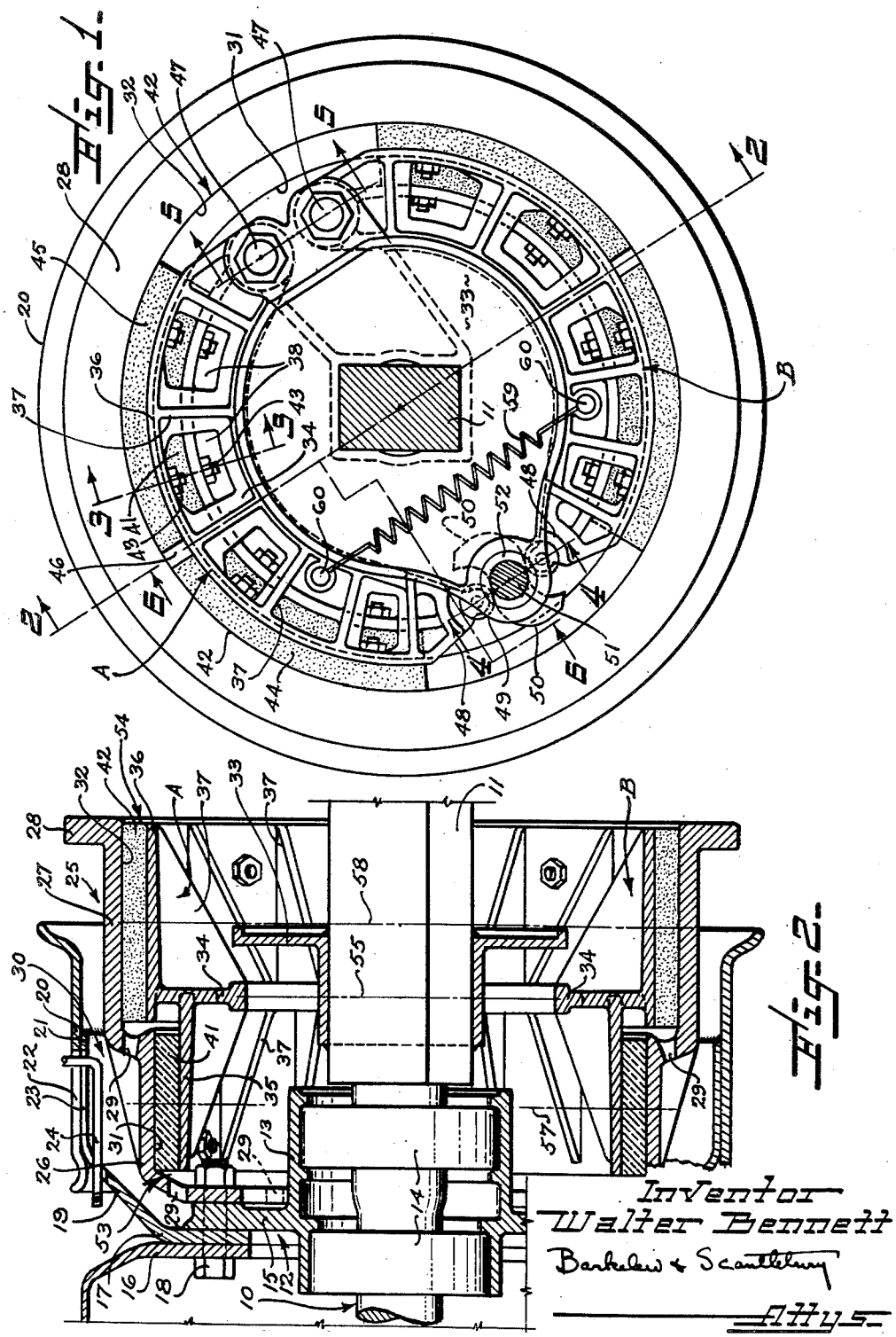

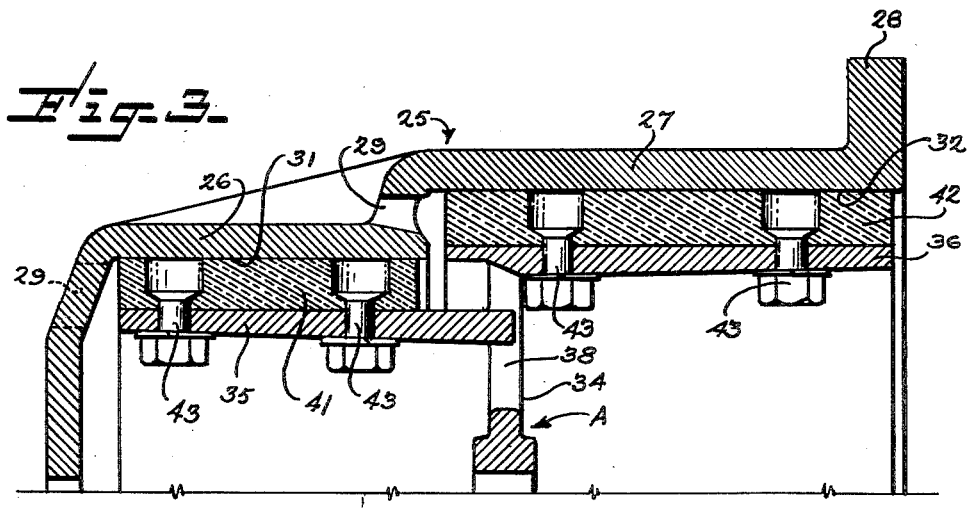

Patented June 29, 1954

2,682,319

UNITED STATES PATENT OFFICE 2,682,319

BRAKE

Walter Bennett, Los Angeles, Calif., assignor to Utility Trailer Manufacturing Company, Los Angeles, Calif., a corporation of California Application December 8, 1947, Serial No. 790,327

7 Claims. (Cl. 188—79)

This invention relates generally to vehicle brakes and is more particularly concerned with dual brakes of the type wherein a plurality of brake shoes are simultaneously applied to a brake drum at side-by-side zones.

Though not at all limited thereto, the invention is particularly well adapted to the brakes of heavy duty trailers of the dual-wheel variety, that is, where the wheels are arranged side-by-side in pairs with the two wheels of each pair mounted on a single, axle-supported member.

There has been continuous effort to increase the effective braking surface of such installations, but the limitations and problems are decidedly severe. Increase of drum diameters and/or widths is not only limited by space considerations but is practicably prohibitive because of the difficult problems of application and wear-characteristics which it creates, as is well recognized by those working in the art.

In one type of dual-wheel construction, the inner wheel of a given pair carries a deep-belled drum. The conical bell-portion of the drum is of relative reduced-diameter and lies wholly within the rim of the inner wheel. The annular skirt of the drum is of larger diameter and extends axially inward beyond the rim. It is upon this skirt portion that the usual brake drum surface is formed. The extent of brake-drum surface permissible to such a skirt is definitely limited by structural characteristics of the running gear and by brake shoe problems, both as to application and as to wear.

As a means for providing additional brake surface in spite of the above inherent difficulties, I have utilized the bell-portion of the drum, a portion which has heretofore been used only to support the usual skirt or flange portion at a position sufficiently inward toward the center of the chassis to enable maximum allowable diameter to the braking surface and to enable easy installation and operation of the applying mechanism.

To this end I have made the bell-portion substantially cylindrical and have formed an internal brake-drum surface within that portion. I have then provided brake shoes (or, more generally, a "braking element" which may include a one-piece "band" as distinguished from a plurality of shoes) for this surface, the shoes being operatively connected to the applying mechanism which operates the brake shoes associated with the drum skirt, whereby all shoes are simultaneously appliable.

Thus, I have added very materially to the effective area of braking surface, with obvious great advantage and yet I have in no way created the problems incidental to an attempted increase in the diameter or width of the usual "skirt" drum.

Ordinarily, though not always, the available space within the bell-portion is such that the width of the braking surface therein is less than that of the braking surface of the skirt portion, with a corresponding difference in brake-shoe widths. With other factors being equal, or not materially affecting performance, the differences in brake shoe widths creates certain problems of brake-application. Similar problems are created even though the widths of the shoes be equal if there be differences in factors such as radiation capacities, coefficients of friction or relative angular extents of the shoes. How these problems are solved—and the solutions apply even in situations where the braking zones are of equal diameter—can best be understood by reference to the following detailed description, wherein other objects and features of the invention are made apparent. Reference will be made to the accompanying drawings, in which:

Fig. 1 is a side elevation of a wheel equipped with my improved brake;

Fig. 2 is a section on line 2—2 of Fig. 1;

Fig. 3 is an enlarged, fragmentary section on line 3—3 of Fig. 1;

Fig. 4 is an enlarged fragmentary section on line 4—4 of Fig. 1;

Fig. 5 is an enlarged fragmentary section on line 5—5 of Fig. 1;

Fig. 6 is a schematic view showing conventionally certain elements of Figs. 1 and 2, but it may be considered broadly as corresponding to a section on line 6—6 of Fig. 1;

Fig. 7 is a schematic view, generally similar to Fig. 6, but showing a variational embodiment of the invention;

Fig. 8 is a schematic view similar to Fig. 7, but showing a variation thereover;

Fig. 9 is a schematic view showing another variational embodiment of the invention; and Fig. 10 is a detached, plan view of the equalizing connection shown in Fig. 9.

I have illustrated the brake in association with dual wheels such as are used on heavy duty trailers wherein the axles are "dead," but it is to be understood this is for illustrative purposes, only, and is not to be considered as limitative on the invention.

In Figs. 1 and 2 the wheel axle is shown at 10, the axle having a portion 11 of rectangular cross-section. The wheel, proper, 12, includes a hub-portion 13 mounted for rotation on axle 10 through usual bearings 14. Hub 13 has an annular flange 15 to which wheel-disks 16 and 17 are detachably secured by bolts 18. Disk 17 is cupped at 19, the tire rim 20 being welded to the cup-flange 21. Cup 19 and rim 20 are slotted at 22 and 23, respectively, to receive the valve stem 24 of a tire (not shown) mounted on rim 20. Disk 16 is adapted to support a tire rim (not shown) similar to rim 20.

My improved brake-drum is indicated generally at 25 and comprises a cylindrical, open-ended bell-section 26 and a larger-diameter, skirt, portion 27, the latter terminating in an external annular flange 28. Bell-portion 26 is detachably held to wheel flange 15 by bolts 18, and ventilation openings 29 are provided for the circulation of brake-cooling air. It is important, also, that the drum be appreciably spaced, as at 30, from valve-stem 24, so the heat generated during brake-application may not have harmful effect on the stem or tire. The stem, and the annular clearance necessarily maintained between it and the brake drum, limit the diameter of that portion of the brake drum which may be contained within the cup 19 of disk 17. The bell-portion 26 of the drum is entirely contained within the rim 20, while skirt portion 27 lies about half within and half without the rim.

The bell and skirt portions of the drum are internally machined to different diameters, thus providing stepped, concentric braking surfaces or zones 31 and 32, respectively of relatively small and relatively larger diameters, the two zones or steps being side by side but being relatively spaced in the direction of their common axis. Surface 32 is wider than 31, though this width-relationship is not to be considered as limitative.

Welded to the rectangular section 11 of axle 10 is a stationary, rigid carrier member or plate 33 for supporting the two shoe members generally indicated at A and B. Shoe members A and B are, in all essence, alike and operate in the same manner. Therefore only one will be described in detail and, when future mention is made to a "plurality" of shoes, reference will be had to the plural shoes of a single member A or B. In this connection, however, it is to be understood that the showing of segmental shoes A and B making up a single brake unit is not to be considered as limiting the invention against adaptation to the one-piece, band type of shoe.

Member A is made up of an arcuate web or body-portion 34, from opposite sides of which extend arcuate flanges 35 and 36 adapted to be taken within bell-drum 26 and skirt-drum 27, respectively. Radial ribs 37 lend structural support to the flanges, and the body portion 34 is lightened in weight by the provision of openings 38. Brake linings 41 and 42 are replaceably secured to flanges 35 and 36, respectively, by studs 43 (Fig. 3) and are substantially complementary in curvature to brake-drum surfaces 31 and 32, respectively. Lining 42 may be made up of a plurality of sections 44, 45 spaced slightly apart as at 46, but the two sections will be considered, in the following analysis, as though they were continuous or were butted end-to-end, thus representing a lining 42 which is of slightly less effective angular extent than is lining 41. However, it will be understood that the continuity or sectionalizing of either lining is not important to the broader aspects of the present invention.

Also, though lining 42 is illustrated as being wider than is lining 41, it will be understood this particular relationship is not limitative on the broader aspects of the invention.

Member A is pivotally connected to supporting member 33 at 47 (Figs. 1 and 5) while its distal end 48 carries a roller 49 adapted to engage a cam 50 which is integrated with cam shaft 51 (Figs. 1 and 4) the latter having bearing in the boss 52 of plate 33. Cam shaft 51 is provided with a lever 53' which is adapted to be actuated by applying mechanism (not shown) of any desired character—manual, mechanical or hydraulic.

When cam shaft 51 is rotated in a clockwise direction, as viewed in Fig. 1, cam 50 spreads the distal ends 48 of members A and B, rocking said members about their pivots 47 and simultaneously applying linings 41 and 42 to surfaces 31 and 32, respectively.

For purposes of easy reference, I will hereinafter consider flange 35 and lining 41 as making up a brake-shoe unit 53 cooperating with bell-drum 26, and flange 36 and lining 42 as making up a brake-shoe unit 54 cooperating with skirt-drum 27.

It will thus be seen that rotation of cam shaft 51 in a clockwise direction, as viewed in Fig. 1, causes simultaneous engagement of shoes 53 and 54 with their respective drum surfaces 31 and 32 and that the total area of effective braking surface thus is materially increased over that of a usual single shoe (for instance, as represented by 54) to very obvious advantage.

In preparation for the analysis which is to follow, it is to be noted that the thrust exerted by cam 50 on the distal end of member A is applied to roller 49 at a point lying in a plane 55 which is normal to the braking surfaces 31 and 32. Plane 55 is parallel to and lies between the medium planes 57 and 58 of linings 41 and 42, respectively. The proportionate spacing of the median planes from the intermediate plane of thrust will be treated later.

When it is desired to release the brakes, cam 50 is rotated, or allowed to rotate, in a counterclockwise direction, as viewed in Fig. 1; spring 59, applied to studs 60 on members A and B, retracting the distal ends of those members to disengage the several brake linings from their associated drum-surfaces.

For the purpose of discussing certain aspects of the theory of arrangement and operation, I will refer particularly to the schematic showing of Fig. 6, concern being had with only member A, since everything said of that member applies with equal force to member B.

In Fig. 6, the width of shoe 53 is represented by $Wb$, the total reaction pressure on the shoe is represented by $Pb$ and the distance between the median plane of shoe 53 and the plane 55 of thrust is represented by $y$. The width of shoe 54 is represented by $Wa$, the total reaction pressure on that shoe is represented by $Pa$ and the distance between the median plane of shoe 54 and the plane 55 of thrust is represented by $x$. The width of the space between opposing edges of shoes 53 and 54 is represented by $s$.

Though not indicated in the drawings, $pb$ may be considered the unit area pressure on shoe 53, and $Ab$ the effective surface area of that shoe, the total pressure $Pb$ thus being the product of $pb$ and $Ab$. The effective angular extent of shoe 53 is taken a $\angle b$, while the coefficient of friction of the shoe 53 on drum 26 is taken as $Cb$. Similarly, $pa$ may be considered the unit area pressure on shoe 54, $Aa$ the effective surface area of that shoe, $\angle a$ the effective angular extent of shoe 54, and $Ca$ the coefficient of friction of the shoe 54 on drum 27. The unit area heat dissipating capacities of drums 26 and 27 will be represented by $rb$ and $ra$, respectively.

It will be seen that the proportionate values of $x$ and $y$ play an important part in the performance of the brake, for, assuming all other factors have given relative values, the final, desired balanced effect may be secured by the compensating effect of an appropriate proportioning of the $x$ and $y$ values.

In order that the several shoes and drums may wear evenly, and give the best overall performance, including substantially equalized drum-expansion, it is important that certain heat balances be effected. Ideally, there must be an equilibrium established between generated heat and dissipated heat. We may approach the problem from two angles. Assume the drum structure be such that the ratio of unit area heat dissipation capacities of the drum zones 26 and 27 be known. Then the characteristics of the braking elements and applying mechanism ideally should be such that the unit area heat generating abilities of the two shoes be in that same ratio. Or, if the characteristics of the braking elements and the applying mechanism are first established to produce a given ratio of unit area heat generating abilities, the drum structure may then be designed to give the drum zones unit area heat dissipating abilities in substantially the same ratio.

Consider first a situation where the ratio of unit area heat dissipation capacities of the two drum zones 27 and 26 is 1:1. Then, with brake linings of given widths, angular extents and coefficients of friction on the given drum surfaces, we wish to determine what proportionate dimensions $x$ and $y$ will balance unit area heat generating abilities of the two shoes 54 and 53.

It is provable that, to accomplish this condition of equilibrium, $x$ must be to $y$ as $(Wb)(\angle b)(Ca)$ is to $(Wa)(\angle a)(Cb)$. In other words, if the widths of the two shoes be equal and the angular extents of the shoes be equal, $x$ and $y$ should be directly proportional to the coefficients of friction of the two shoes. If the widths of the two shoes are equal and the coefficients of friction of the two shoes are equal, $x$ and $y$ should be inversely proportional to the angular extents of the two shoes. If the angular extents of the two shoes are equal and the coefficients of friction of the two shoes are equal, $x$ and $y$ should be inversely proportional to the widths of the two shoes.

By way of example, in the embodiment shown in Fig. 1, it may be assumed that the heat dissipation ratio is 1:1 and that the coefficients of friction of the two shoes on the given drum surfaces are equal. However, the ratio of the widths of shoes 54 and 53 is 6 to 4 and the ratio of angular extents of shoes 54 and 53 is 120 to 125. Then, by the formula, $x$ is to $y$ as $(Wb)(\angle b)$ is to $(Wa)(\angle a)$ or $$\frac{x}{y}=\frac{(4)(125)}{(6)(120)}=\frac{25}{36}$$

So $x:y::25:36$.

This gives $y$ a value of $1.44x$.

The total distance $x+y$ equals one half the sum of the shoe widths plus the width $s$ of the space between the opposing edges of the shoes, or, in the illustrated case, 5.375''. Substituting values, we find that, to satisfy all conditions, $x$ equals 2.202'' and $y$ equals 3.172'', the plane 55 of thrust application thus being 2.202'' from the median plane 58 of shoe 54 and being 3.172'' from the median plane 57 of shoe 53. In other words, the distances from the median planes of the shoes to the plane of thrust are inversely proportional to the widths of the respective shoes.

With the point of thrust lying in the plane 55, it is assured that the unit area of heat generating abilities of the two shoes are balanced, and, since it was assumed that the heat radiating or dissipating capacities of the two systems balance, there is the desired equilibrium between heat generation and dissipation in the combined systems.

If the shoe and applying system be first calculated to give balanced unit area heat generating abilities, the drum structure may be designed to have balanced unit area heat dissipating capacity to insure the maintenance of equalized unit area brake temperatures within allowable limits. This may be done by properly proportioning the thickness dimensions of the drum parts, or providing for proper air cooling circulation, or by providing cooling fins, or by utilizing combinations of such factors.

If we start with the premise that the unit area heat dissipating capacities of the two drums are in some given ratio other than one-to-one, we may proceed as follows. For instance, assume that the heat dissipating capacities of zones 27 and 26 are in the ratio of $ra$ to $rb$ and that this is other than a one-to-one ratio. Since the unit area heat generating abilities should vary directly as the dissipating values, we need merely introduce these values for heat dissipation in the general formula and then solve for $x$ and $y$, as above. The general formula, as so modified, becomes $$x:y::(rb)(Wb)(\angle b)(Ca):(ra)(Wa)(\angle a)(Cb)$$

This means that, all other factors being equal, $x$ and $y$ are made to be substantially inversely proportional to the heat dissipating capacities of the respective drum-zones.

It will thus be seen that no matter what the several factors may be (within reasonable limits) the proper shifting of the plane of thrust application to vary the proportionate distances between it and the median plane of the shoes, enables one to secure the characteristics of unit area heat generating ability which will bring about the best brake performances.

In connection with the variational embodiments I am now to describe, I have shown them schematically along the lines of Fig. 6, but it will be understood that their general structural characteristics may be, so far as applicable, equivalent to the showing and description of Figs. 1 and 2.

In Fig. 7 the deep-bell drum 25a is made up of bell-drum 26a and skirt drum 27a having stepped braking surfaces 31a and 32a, respectively. Here, however, shoes 53a and 54a are structurally independent, each having an individual body portion 34a and an individual roller 49a. These rollers are engaged with individual, but similar, cams 50a which are operated simultaneously by cam shaft 51a to cause simultaneous braking applications of shoes 53a and 54a to their respective drum-zones 26a and 27a. Since, in this arrangement, the total pressures of shoes 53 and 54 are equal and the effective area of shoe 53 is less that that of shoe 54, the unit pressure on drum 26a will be greater than that on drum 27a. Accordingly, more heat per unit area is generated in drum 26a than in drum 27a. In order to compensate at least partially for this condition, drum 26a may be provided with external heat radiating fins 61 which are adapted to increase the heat radiating or dissipating capacity of drum 26a over that of drum 27a, thus effecting substantial balance of operating heat conditions in the two braking units.

Fig. 8 is similar to Fig. 7 in all respects except for the omission of fins 61 and the inclusion of an inset brake drum 62 secured to drum 26 at 70. If desired, the material of drum 62 may be such that the coefficient of friction of the brake unit 53b on drum 62 has a different value than that of the coefficient of friction of the brake unit 54b on drum 27b. As the unit heat generating abilities of the shoes are functions of their coefficients of friction on their respective drums, the drum 62 may be chosen of such material that the unit heat generating abilities of the two braking units are substantially balanced or have any desired ratio, in spite of the fact that the unit area pressures on the two drums are unequal since the two drums are of different effective areas and yet the total pressures on each are the same.

Figs. 9 and 10 illustrate an embodiment similar to Fig. 7 except that the separate shoe units 53c and 54c are actuated by separate cams and cam shafts, though the cams are operated simultaneously through an equalizing system. Cam 50d, for shoe 53c, is on cam shaft 51d which is telescoped within the tubular cam shaft 51e, the latter carrying a cam 50e for shoe 54c. Crank arms 63 and 64 are provided on shafts 51e and 51d, respectively, and they have universal joint or other suitable connection at 65 and 66, respectively, with equalizer bar 67. The brake-applying rod 68, adapted to be actuated by any suitable mechanical or hydraulic mechanism (not shown) is applied to bar 67 at 69.

Since the effective braking area of shoe 53c is less than that of shoe 54c and it is desirable that their units area pressures be equalized in order that the described balance between heat generating and heat dissipating capacities may be secured and maintained, the point 69 at which rod 68 applies force to bar 67 is chosen to give the particular distribution of pressures to the shoes which will bring about the desired condition.

This is accomplished by applying the same formulae as that given in connection with Figs. 1 and 6, except that here $x$ represents the distance from point 69 to point 65 (which is in the connection leading to the large-area shoe 54c) while $y$ represents the distance from point 69 to point 66 (which is in the connection to the small-area shoe 53c).

For instance, if all the controlling factors except shoe widths were balanced in the two brake-units, the distance $x$ and $y$ should be inversely proportional to the effective widths of the shoes 54c and 53c. If the controlling factors, other than width, vary, they are introduced into the formulae just as explained in connection with Fig. 6, and they will modify the proportionate spacing between points 65, 66 and 69, just as they modified the proportionate spacing between planes 58, 57 and 55.

While I have shown and described preferred embodiments of my invention, it will be understood that various changes in design, structure and arrangement may be made without departing from the spirit and scope of the appended claims.

I claim:

1. In a brake, a brake drum, a pair of arcuate, rigidly and integrally connected braking elements of different radii and having given effective widths adapted to engage, one each, axially displaced, cylindric braking surfaces on said drum, and brake-actuating means applied to said rigidly connected elements at a point lying in a plane normal to the braking surfaces, which plane is parallel to and lies between the median planes of the elements, with the axial spacing between the first mentioned plane and the median planes being substantially inversely proportional to the widths of the respective elements.

2. In a brake, a deep-belled drum for attachment to a vehicle wheel, said drum having a bell-portion and an integral skirt portion of larger diameter than the bell-portion, an internal, cylindrical brake-drum surface in the bell-portion, and a larger-diameter, internal, cylindrical brake drum surface in the skirt portion, a pair of arcuate, concentric brake shoes of different diameters and adapted, one each, to brakingly engage said surfaces, said shoes being substantially equally radially spaced from the associated braking surfaces when the brake is unapplied, and means rigidly connecting said shoes to each other for simultaneous movement in directions normal to their axes.

3. In a brake, a brake drum having a pair of concentric, axially displaced cylindric braking surfaces, a pair of rigidly and integrally connected, arcuate braking elements complementary to and adapted to engage, one each, said cylindric surfaces, and brake-actuating means applied to said rigidly connected elements at a point lying in a plane normal to the braking surfaces, which plane is parallel to and lies between the median planes of the elements; the axial spacing between the first mentioned plane and said two median planes being determined by the formula $$X:Y::(rb)(Wb)(\angle b)(Ca):(ra)(Wa)(\angle a)(Cb)$$

where X is the axial spacing between the first mentioned plane and one of said median planes, Y is the axial spacing between the first mentioned plane and the other median plane, $s$ is the width of the space, if any, between the inner, opposite edges of said elements, $rb$ is the unit area heat dissipating capacity of the portion of the drum defining the braking surface associated with said other median plane, $Wb$ is the width of the braking element associated with said other median plane, $\angle b$ is the effective angular extent of the last mentioned braking element, $Ca$ is the coefficient of friction of the other braking element on its associated braking surface, $ra$ is the unit area heat dissipating capacity of the portion of the drum defining the braking surface associated with said one median plane, $Wa$ is the width of the braking element associated with said one median plane, $\angle a$ is the effective angular extent of the last mentioned braking element, $Cb$ is the coefficient of friction of the other braking element on its associated braking surface, and the value $x+y=\frac{1}{2}(Wa+Wb)+s$.

4. In a brake, a brake drum having a pair of concentric, axially displaced cylindric braking surfaces of different widths, a pair of rigidly and integrally connected, arcuate braking elements complementary to and adapted to engage, one each, said cylindric surfaces, and brake-actuating means applied to said rigidly connected elements at a point lying in a plane normal to the braking surfaces, which plane is parallel to and lies between the median planes of the elements; the axial spacing between the first mentioned plane and said two median planes being determined by the formula $$X:Y::(rb)(Wb)(\angle b)(Ca):(ra)(Wa)(\angle a)(Cb)$$

where X is the axial spacing between the first mentioned plane and one of said median planes, Y is the axial spacing between the first mentioned plane and the other median plane, s is the width of the space, if any, between the inner, opposite edges of said elements, rb is the unit area heat dissipating capacity of the portion of the drum defining the braking surface associated with said other median plane, Wb is the width of the braking element associated with said other median plane, $\angle b$ is the effective angular extent of the last mentioned braking element, Ca is the coefficient of friction of the other braking element on its associated braking surface, ra is the unit area heat dissipating capacity of the portion of the drum defining the braking surface associated with said one median plane, Wa is the width of the braking element associated with said one median plane, $\angle a$ is the effective angular extent of the last mentioned braking element, Cb is the coefficient of friction of the other braking element on its associated braking surface, and the value $X+Y=\frac{1}{2}(Wa+Wb)+s$.

5. In a brake, a brake drum having a pair of concentric, axially displaced cylindric braking surfaces of different widths and radii, a pair of rigidly and integrally connected, arcuate braking elements complementary to and adapted to engage, one each, said cylindric surfaces, and brake-actuating means applied to said rigidly connected elements at a point lying in a plane normal to the braking surfaces, which plane is parallel to and lies between the median planes of the elements; the axial spacing between the first mentioned plane and said two median planes being determined by the formula $$X:Y::(rb)(Wb)(\angle b)(Ca):(ra)(Wa)(\angle a)(Cb)$$

where X is the axial spacing between the first mentioned plane and one of said median planes, Y is the axial spacing between the first mentioned plane and the other median plane, s is the width of the space, if any, between the inner, opposite edges of said elements, rb is the unit area heat dissipating capacity of the portion of the drum defining the braking surface associated with said other median plane, Wb is the width of the braking element associated with said other median plane, $\angle b$ is the effective angular extent of the last mentioned braking element, Ca is the coefficient of friction of the other braking element on its associated braking surface, ra is the unit area heat dissipating capacity of the portion of the drum defining the braking surface associated with said one median plane, Wa is the width of the braking element associated with said one median plane, $\angle a$ is the effective angular extent of the last mentioned braking element, Cb is the coefficient of friction of the other braking element on its associated braking surface, and the value $X+Y=\frac{1}{2}(Wa+Wb)+s$.

6. In a shoe for brakes, a pair of integrated, axially displaced, arcuate and concentric brake elements of different radii and given effective widths, and a radial, internally extending web integral with said elements and lying in a plane normal to the braking surfaces thereof, which plane is parallel to and lies between the median planes of the elements, with the axial spacing between the first mentioned plane and the median planes being substantially inversely proportional to the widths of the respective braking surfaces.

7. In a brake according to claim 2; wherein said shoes are of given effective widths and including also brake shoe actuating means applied to said rigidly connected shoes at a point lying in a plane normal to the brake drum surfaces, which plane is parallel to and lies between the median planes of the shoes, with the axial spacing between the first mentioned plane and the median planes being substantially inversely proportional to the widths of the respective shoes.

References Cited in the file of this patent

UNITED STATES PATENTS

| Number | Name | Date |
|---|---|---|
| 1,317,503 | Josephson | Sept. 30, 1919 |
| 1,425,414 | Page | Aug. 8, 1922 |
| 1,870,605 | Conlon et al. | Aug. 9, 1932 |
| 1,874,180 | Garrett | Aug. 30, 1932 |
| 2,042,445 | Eksergian | May 26, 1936 |
| 2,190,052 | Van Raalte | Feb. 13, 1940 |
| 2,334,692 | Ash | Nov. 23, 1942 |
| 2,345,192 | Garnett et al. | Mar. 28, 1944 |
| 2,435,048 | McPherson | Jan. 27, 1948 |
| 2,527,865 | Weiland | Oct. 31, 1950 |

FOREIGN PATENTS

| Number | Country | Date |
|---|---|---|
| 461,500 | Great Britain | Feb. 15, 1937 |

OTHER REFERENCES

Dyke's Automobile and Gasoline Engine Handbook, Twentieth Edition, 1943, page 1145, Goodheart-Willcox Co. Inc., Chicago, Ill., publishers.

Automobile Engineer, May 1937, pages 162–163.